US 9,978,094 B2

(12) United States Patent
Gaddam et al.

(10) Patent No.: US 9,978,094 B2
(45) Date of Patent: May 22, 2018

(54) TOKENIZATION REVOCATION LIST

(71) Applicant: Visa International Service Association, San Francisco, CA (US)

(72) Inventors: Ajit Gaddam, Sunnyvale, CA (US); Selim Aissi, Menlo Park, CA (US); Sekhar Nagasundaram, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 284 days.

(21) Appl. No.: 14/512,231

(22) Filed: Oct. 10, 2014

(65) Prior Publication Data

US 2015/0106239 A1 Apr. 16, 2015

Related U.S. Application Data

(60) Provisional application No. 61/889,987, filed on Oct. 11, 2013.

(51) Int. Cl.
*G06Q 30/00* (2012.01)
*G06F 17/00* (2006.01)
*G06Q 30/06* (2012.01)
*G06F 17/30* (2006.01)
*G06Q 20/08* (2012.01)
*G06Q 20/40* (2012.01)

(52) U.S. Cl.
CPC ... *G06Q 30/0637* (2013.01); *G06F 17/30864* (2013.01); *G06Q 20/08* (2013.01); *G06Q 20/40* (2013.01)

(58) Field of Classification Search
CPC .............................. G06Q 20/08; G06Q 20/40
See application file for complete search history.

(56) References Cited

U.S. PATENT DOCUMENTS

| 5,613,012 A | 3/1997 | Hoffman |
| 5,781,438 A | 7/1998 | Lee |
| 5,883,810 A | 3/1999 | Franklin |
| 5,953,710 A | 9/1999 | Fleming |

(Continued)

FOREIGN PATENT DOCUMENTS

| EP | 2156397 A1 | 2/2010 |
| WO | 2001035304 A1 | 5/2001 |

(Continued)

OTHER PUBLICATIONS

"5 things you need to know about new Payment Card Industry (PCI 3.0) standard, Nov. 7, 2013, Network World" (Year: 2013).*

(Continued)

*Primary Examiner* — Michael Misiaszek
*Assistant Examiner* — Matthew W Todd
(74) *Attorney, Agent, or Firm* — Kilpatrick Townsend Stockton LLP

(57) ABSTRACT

A method for providing a token revocation list is disclosed. The method includes maintaining a status for each of a plurality of tokens in a token revocation database. Token validation requests are received, and the statuses of payment tokens can be determined. Response messages with the statuses of the payment tokens are then sent to token status requesters so that they may make decisions on whether or not to use them to process transactions.

23 Claims, 5 Drawing Sheets

(56) References Cited

U.S. PATENT DOCUMENTS

| | | |
|---|---|---|
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 * | 12/2001 | Linehan ............ G06Q 20/02 705/65 |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,827,101 B2 * | 11/2010 | Mascavage, III ...... G06Q 20/04 705/39 |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |

(56) References Cited

U.S. PATENT DOCUMENTS

| | | |
|---|---|---|
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,092,777 B1* | 7/2015 | Gaspar ............... G06Q 20/385 |
| 9,100,826 B2 | 8/2015 | Weiss |
| 9,160,741 B2 | 10/2015 | Wentker et al. |
| 9,202,086 B1* | 12/2015 | Mattsson ............ G06F 21/6245 |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |

(56) References Cited

U.S. PATENT DOCUMENTS

| | | |
|---|---|---|
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0198240 A1* | 8/2012 | Tie ............... H04L 9/3213 713/176 |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1* | 5/2013 | Lyman ............ G06Q 20/20 705/18 |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |

(56) References Cited

U.S. PATENT DOCUMENTS

| | | |
|---|---|---|
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

U.S. Appl. No. 14/340,444, filed Jul. 24, 2014, entitled, Systems and Methods for Interoperable Network Token Processing, 117 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

McGuire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al., U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

Wong et al., U.S. Appl. No. 61/879,362 (unpublished), Systems and Methods for Managing Mobile Cardholder Verification Methods filed Sep. 18, 2013.

(56) References Cited

OTHER PUBLICATIONS

Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.

* cited by examiner

TOKENIZATION REVOCATION LIST

CROSS-REFERENCE TO RELATED APPLICATIONS

This application is a non-provisional application of and claims the benefit of the filing date of U.S. Provisional Patent Application No. 61/889,987, which was filed on Oct. 11, 2013, which is herein incorporated by reference in its entirety for all purposes.

BACKGROUND

In a tokenized payment transaction, a consumer provides a merchant with a token, which can represent an account that is associated with the consumer. In the case of credit and debit card transactions, the account may be issued and held by an issuer, which is typically a bank. The token may be a substitute account number that is associated with the real account number, but is not the real account number. Tokens can be limited in use and provide greater security for the payment transaction. If the token is obtained by an unauthorized person in a fraudulent manner, the real account number is not compromised.

While tokenized payment transactions are useful, a merchant that accepts a token may not be able to confirm that the token is valid. For example, a token may be expired, compromised, or invalid for a number of reasons. The merchant may be unaware that the payment token that is provided for payment is invalid until the token is submitted for authorization and authorization is subsequently denied. As a result, the merchant or issuer may incur unnecessary losses.

Another issue to be addressed is that there are many different parties in the payment ecosystem that can generate and/or transform tokens. Thus, it may be the case that entities including merchants, issuers, payment processors, third parties and the like might issue payment tokens and/or further tokenize or transform payment tokens. Because tokens are inherently unrecognizable substitutes for account numbers, it is difficult if not impossible for the party holding the payment token to determine which entity issued the token and check on its status. Further, even if the possessor of the token could determine the entities that actually issued the payment tokens that it received, it would be frustrating and difficult for the possessor to check with multiple entities as to the validity of the tokens that it receives. As noted above, tokens may be generated by issuers, payment processors, and even merchants.

Embodiments of the present invention solve these problems and other problems, individually and collectively.

SUMMARY

Embodiments of the invention are directed to methods and systems for validating payment tokens using a tokenization revocation list. The token revocation list may be in a token revocation list computer system, which may include the token statuses of tokens generated by different entities. Since the token revocation list computer system can consolidate the payment tokens generated by multiple different entities, the token revocation list may serve as a single communication point for a token status requester to check on the status of a payment token, regardless of which entity actually generated the payment token.

One embodiment of the invention is directed to a method. The method comprising maintaining, by a token revocation list computer system, a status for each of a plurality of tokens issued by the server computer in a token revocation database, and then receiving, by the token revocation list computer system, a token validation request from a requester device. The token validation request includes at least one payment token of the plurality of tokens. The method further comprises determining, by the token revocation list computer system, the status of the at least one payment token of the plurality of tokens by searching the token revocation database for the status of the at least one of the plurality of tokens. After the status is determined, the token revocation list computer system sends a token validation response including the determined status of the at least one payment token of the plurality of tokens.

Another embodiment of the invention is directed to a token revocation list computer system comprising a token status list database and a token status list computer comprising a processor, and a computer readable medium coupled to the processor. The computer readable medium comprises code, executable by the processor, to implement a method. The method comprises maintaining a status for each of a plurality of tokens issued by the server computer in a token revocation database, and receiving a token validation request from a requester. The token validation request includes at least one payment token of the plurality of tokens. The method also comprises determining the status of the at least one of the plurality of tokens by searching the token revocation database for the status of the at least one payment token of the plurality of tokens, and sending a token validation response including the determined status of the at least one payment token of the plurality of tokens.

Another embodiment of the invention is directed to a token validation system. The token validation system comprises a requester device and a token revocation list computer system in communication with the requester device. The token revocation list computer system comprises (a) a token status list database and (b) a token status list computer. The token status list computer comprises a processor and a computer readable medium coupled to the processor. The computer readable medium comprises code executable by the processor to implement a method comprising (i) maintaining a status for each of a plurality of tokens issued by the server computer in a token revocation database, (ii) receiving a token validation request from a requester, wherein the token validation request includes at least one payment token of the plurality of tokens, (iii) determining the status of the at least one of the plurality of tokens by searching the token revocation database for the status of the at least one payment token of the plurality of tokens, and (iv) sending a token validation response including the determined status of the at least one payment token of the plurality of tokens.

These and other embodiments are described in further detail below with reference to the Drawings and the Detailed Description.

DETAILED DESCRIPTION

Figure 1:
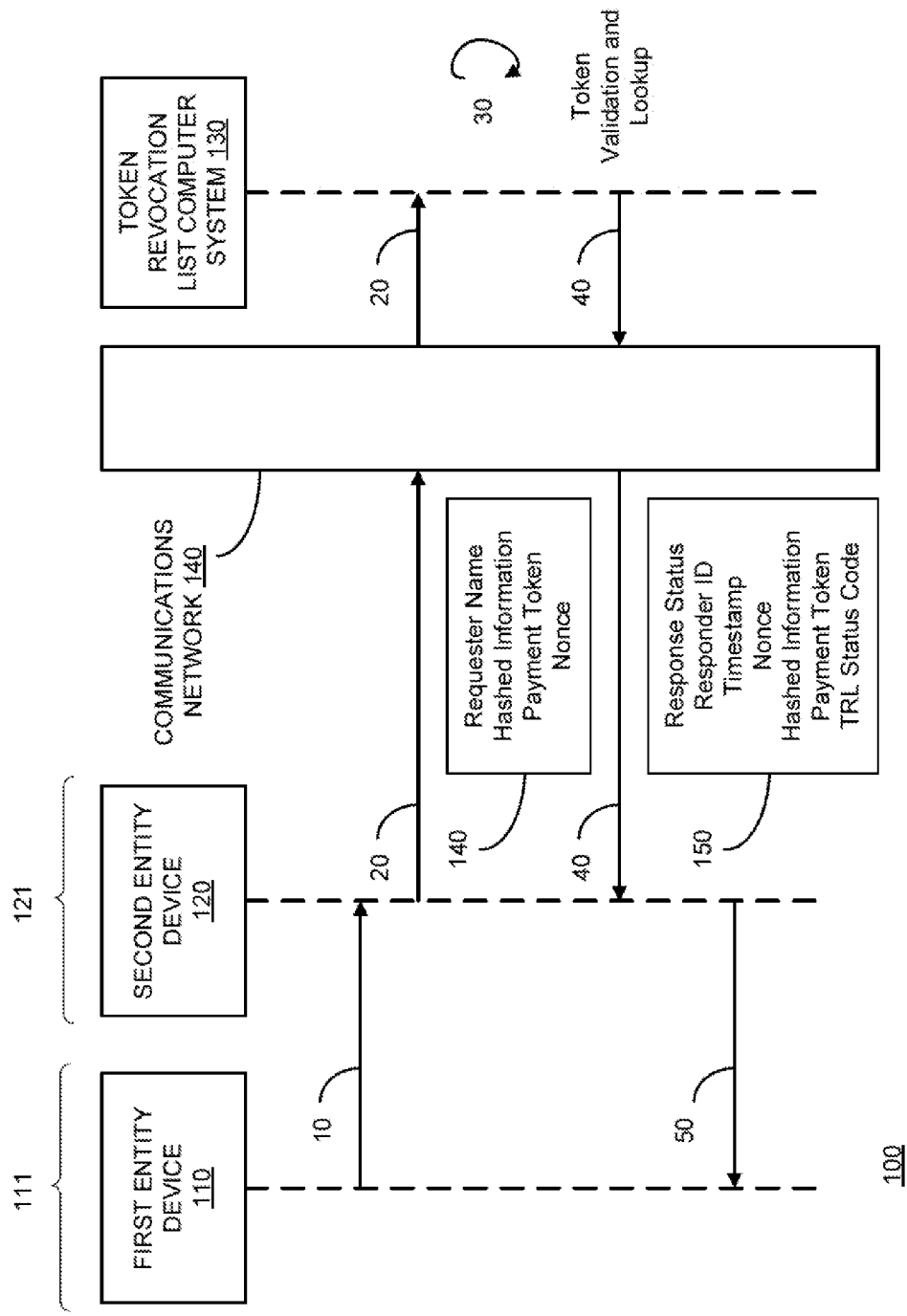
FIG. 1 shows a portion of a token validation system according to an exemplary embodiment of the present invention.

Embodiments of the invention are directed to methods and systems for validating tokens using a tokenization revocation list (TRL) responder, which may alternatively be referred to as a tokenization revocation list (TRL) computer system.

A "token" may include an identifier for a payment account that is a substitute for an account identifier, such as a primary account number (PAN). For example, a token may include a series of alphanumeric characters that may be used as a substitute for an original account identifier (e.g., a pseudo account number). For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

As noted above, in a tokenized payment transaction, a consumer may provide a payment token to a merchant instead of a real account number. The merchant processes the payment token like a credit or debit card number to obtain payment for a good or service from the consumer's account. However, these transactions can be insecure, because the token may have expired, been compromised, or rendered invalid for other reasons. If the merchant waits until a later time to authorize the transaction, the merchant may not discover that a token is invalid until authorization is denied.

It would be desirable to provide for a trusted entity such as a TRL computer system, which can verify the validity of a payment token. For example, a POS terminal at a merchant can tokenize a PAN (primary account number) to produce an initial payment token. Any upstream consumers can further tokenize the initial token to produce a subsequent payment token. This process can remove the trust chain and can make the application of value added services like risk and fraud identification difficult. Further, in the case where there is a flagged risk, there is no current method to determine if a payment token is no longer valid as a payment instrument. However, embodiments of the present invention may validate a payment token by requesting validation from an entity with access to a tokenization revocation list (TRL) computer system. The TRL computer system may provide information regarding whether one or more payment tokens have been revoked or are otherwise in poor standing with any entity in the transaction system.

Illustratively, in one embodiment of the invention, a consumer may purchase goods or services from a merchant and may provide a payment token to the merchant. If the merchant suspects that the token may not be valid for some reason, the merchant can send a token validation request to a TRL computer system. The token validation request may be transmitted from the merchant to the TRL computer system through a communications network that may be insecure. To provide security for the token validation request, the token validation request may comprise information identifying the requesting merchant such as a requester name, hashed information such as a hash of the TRL computer system name, and a hash of a public key, the payment token from the consumer, and a nonce. A hashing algorithm identifier (e.g., SHA-2 or SHA-3 identifier) may also be present in the token validation request, so that the TRL computer system knows which hashing algorithm to use to generate the hashed information. The TRL computer system may maintain a token database that indicates the revocation status of payment tokens issued to various token issuers. The TRL computer system may then locate a record of the payment token in the token validation request and may confirm that it is valid (or not valid).

After determining the validity of the payment token in the token validation request, the TRL computer system may then generate a token validation response to be transmitted from the TRL computer system to the merchant. The token validation response may comprise a response status indicating whether or not the token validation request was accepted, a responder ID such as the TRL computer system public key, a timestamp, the nonce, the hashed information, the payment token, and a TRL status code. The TRL status code may inform the merchant as to whether or not the payment token is valid or not valid. The merchant may then receive the token validation response, accept the payment token if it is valid, and complete the payment transaction with the consumer.

In some embodiments of the invention, the payment token can be used like an ordinary credit or debit card number. For example, an access device (e.g., a POS terminal or merchant Web server) at the merchant may generate an authorization request message. The authorization request message may be transmitted to an acquirer computer operated by an acquirer associated with the merchant. The acquirer computer may then transmit the authorization request message comprising the payment token to a payment processing network, which may have access to a token provider system which issued the payment token.

A payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet.

After the token provider system receives the payment token, the token provider system may then provide the real account number associated with the payment token. A computer in the payment processing network can then generate a modified authorization request message with the real account number and can send the real account number to an issuer computer for authorization.

The issuer computer may then approve or disapprove of the transaction, and may then generate an authorization response message. The authorization response message comprises the real account number and is transmitted to the payment processing network. The computer in the payment processing network may then generate a modified authorization response message comprising the payment token and may transmit this back to the access device via the acquirer computer.

At the end of the day, a clearing and settlement process using the token and the real account number may take place between the acquirer computer, the payment processing network, and the issuer computer. The payment processing network may substitute the payment token for the real account number in the clearing messages, similar to the authorization request messages described above.

The token validation method and system according to embodiments of the invention can provide merchants with greater assurance that their transactions will be processed without interruption. For example, using embodiments of the invention, merchants can decide not to use payment tokens that have not been properly validated. Higher assurance can also be provided for tokens that are generated or stored on mobile devices. Furthermore, using embodiments of the invention, merchants are encouraged to accept tokens and merchants do not have to store sensitive consumer account information. Payments are also more secure for consumers, since payment tokens are more widely accepted and trusted using embodiments of the invention.

Embodiments of the invention providing the further advantage of safeguarding token status information from unauthorized entities. In some cases, fraudsters may illicitly obtain consumers' payment tokens. However, the fraudsters may not know if the payment tokens are valid and usable to conduct transactions. Embodiments of the invention can provide a token validation method that securely validates the identity of a token status requestor. Thus, embodiments can protect against unauthorized entities determining the status of a token.

Therefore, embodiments of the invention improve transaction security for merchants, issuers, payment processors, and consumers. Payment token fraud and risk are reduced when the parties that use or process the payment tokens can be made aware of their validity status.

I. Exemplary Systems

FIG. 1 shows a portion of a token validation system 100 according to an embodiment of the present invention. The token validation system 100 may comprise a first entity device 110 operated by a first entity 111 (e.g., a first merchant A), a second entity device 120 operated by a second entity 121 (e.g., a second merchant B), and a TRL computer system 130. The first entity device 110 may be in communication with the second entity device 120. The first entity device 110 and the second entity device 120 may alternatively be referred to as first and second requester devices, and may be in communication with the TRL computer system 130 via a communications network 140.

The TRL computer system 130 may include a server computer coupled to a token database with information about flagged, revoked, or otherwise invalid payment tokens. In some embodiments, the TRL computer system 130 may also be a token issuer. Further details regarding an exemplary TRL computer system 130 are provided below with reference to FIG. 3.

The communications network 140 may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network 140 may be insecure, and as described herein, various specific communication protocols are provided to ensure that the transmission of token validation requests and responses are secure.

In embodiments of the invention, the second entity 121, which operates the second entity device 120, may enroll in a token validation program. To enroll, the second entity 121 can provide a requester name to the TRL computer system 130 so that the TRL computer system 130 may identify the second entity 121. The TRL computer system 130 may provide information (e.g., hashing algorithms, a TRL responder name or other identifier, a public key, etc.) that will enable secure communication with the second entity 121.

In embodiments of the invention, the TRL computer system 130 may receive and manage information about the status of one more tokens. The TRL computer system 130 may maintain a TRL containing records of the status of tokens. The TRL may compile information that is provided by one or more token issuers and processors such as banks (e.g. issuers, acquirers), payment processors (e.g. Visa™, American Express™), merchants, consumers, or any other entity capable of issuing or processing tokens. The first entity device 110 operated by the first entity 111 may receive tokens from a token issuer (e.g., either of the first or second token provider systems 160, 170 in FIG. 2), and the TRL computer system 130 may also receive information about these tokens from the token issuer. In embodiments where the TRL computer system 130 is a token issuer, the token information may be stored in the tokenization revocation list when a token is issued. In any case, the TRL computer system 130 may be able to anticipate any token that may be submitted by the first entity device 110 operated by first entity 111 and maintain a comprehensive list of existing and possible tokens.

In some embodiments, the first entity 111 operating the first entity device 110 may also enroll with TRL computer system 130. The TRL computer system 130 may be operated by a token issuer and may provide the first entity device 110 operated by the first merchant with a set of tokens or a token generating algorithm for use in transactions. In this scenario, TRL computer system 130 may update the TRL with records of tokens generated by TRL computer system 130. Alternatively, the first entity device 110 operated by the first entity 111 may be a first merchant and a token issuer. The first entity 111 may issue or generate tokens that it will use for payments, such as payments to the second entity 121, which may be a merchant. In this case, the first entity 111 may enroll with the TRL computer system 130 so that the first entity 111 may inform the TRL computer system 130 of a token generation algorithm or a set of tokens that may be used by the first entity 111. Therefore, TRL computer system 130 may be able to update the TRL with information about tokens that may be used by the first entity 111.

In an exemplary illustration, the first entity 111 may be a first merchant that wishes to purchase goods and/or services from the second entity 121, which may be a second merchant. For example, first entity 111 may be a first merchant that may sell products made by the second entity 121, which may be a second merchant. Alternatively, the first entity 111 may be a typical consumer and not a merchant. For example, the first entity 111 may be an end consumer purchasing a final product made or sold by the second entity 121. In this scenario, the first entity 111 may be a consumer that is capable of making payments with tokens. The first entity 111 may receive tokens on a portable consumer device (e.g., a smart card, a mobile phone, a key fob) from a token issuer, and provide a token at a POS device during a transaction with the second entity 121.

The first entity device 110 may be in any suitable form in including, but not limited to a mobile phone, an access device, a standalone or mobile computer, a smart card, etc. In some embodiments, the first entity device 110 may be capable of generating or receiving payment tokens. It may include a token generating algorithm, and/or may receive payment tokens from a token issuer. In some embodiments, the TRL computer system 130 may be a token issuer that provides the first entity device 110 with payment tokens.

The second entity 121 may be a merchant that receives a transaction request and a payment token from the first entity 111. The second entity 121 may operate a second entity device 120, which may have the same or different form as the first entity device 110. The second entity 121 may be an acquirer bank associated with a merchant, a merchant, a consumer, or any other suitable entity. In some embodiments, the second merchant 121 may authorize the payment token immediately, before releasing goods to the first entity 111. In one illustration, the second entity 121 may submit all payment tokens in bulk at the end of the day. The second entity 121 may also be capable to generate a token validation request message, also referred to as a TRL request, and to send the token validation request message to the TRL computer system 130.

The TRL computer system 130 may include a server computer associated with a token issuer and/or a payment processing network. Alternatively, the TRL computer system 130 may be de-centralized and associated with a third party.

Figure 3:
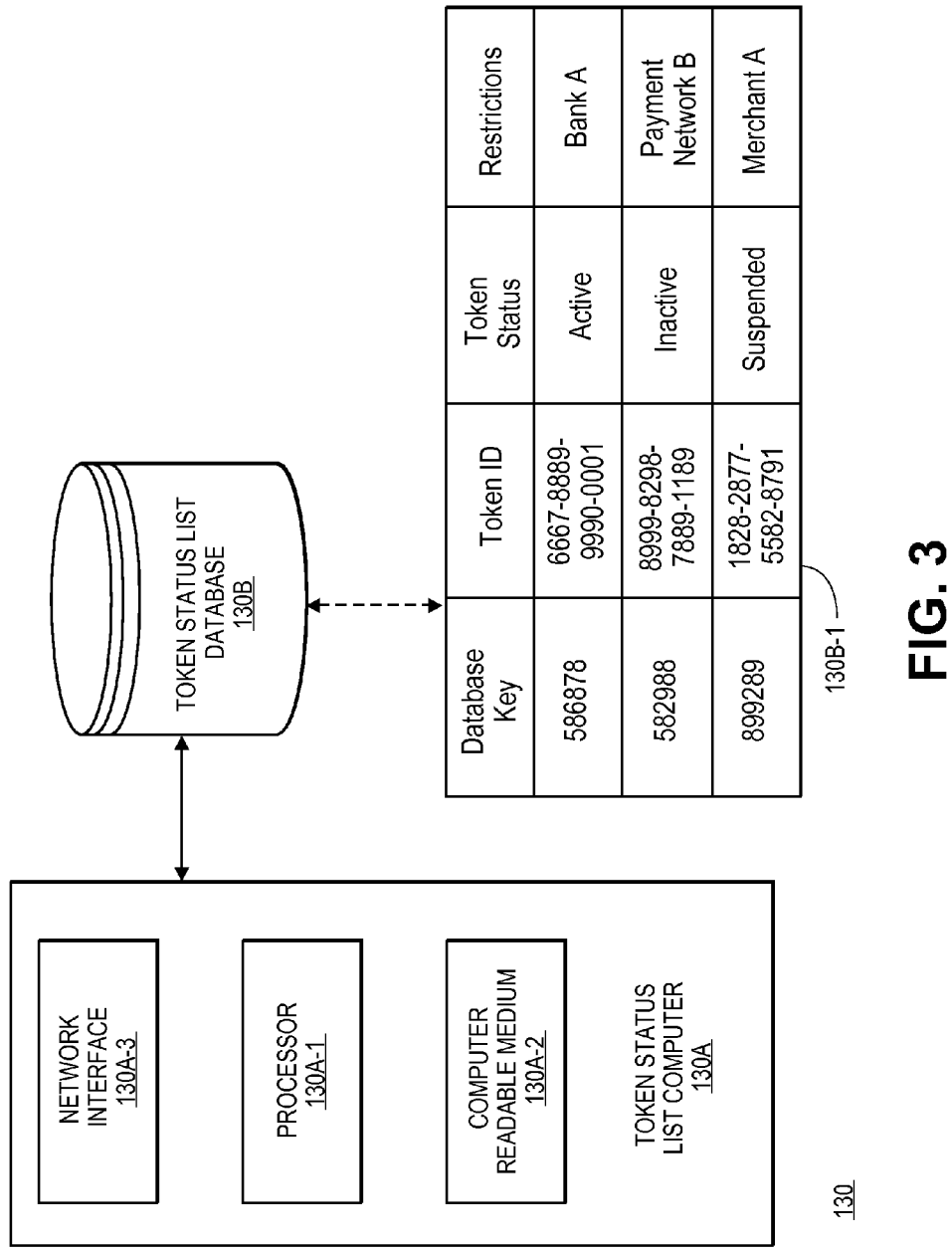
FIG. 3 shows a block diagram of a token revocation list computer system according to an embodiment of the present invention.

FIG. 3 shows a block diagram of some components of a TRL computer system 130 according to an embodiment of the invention. It includes a token status list computer 130A, which may include a processor 130A-1, a computer readable medium 130A-2, and a network interface 130A-3. The token status list computer 130A may be coupled to a token status list database 130B, which may include token data 130B-1.

The processor 130A-1 may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The computer readable medium 130A-2 may comprise code, executable by the processor 130A-1, for implementing a method comprising maintaining a status for each of a plurality of tokens issued by the server computer in a token revocation database, receiving a token validation request from a requester, wherein the token validation request includes at least one payment token of the plurality of tokens, determining the status of the at least one of the plurality of tokens by searching the token revocation database for the status of the at least one payment token of the plurality of tokens, and sending a token validation response including the determined status of the at least one payment token of the plurality of tokens.

The TRL computer system 130 may maintain a list of tokens in the token database 130B, which may include the TRL. The TRL computer system 130 may communicate whether a token or a list of payment tokens have been revoked for various reasons.

Information about the various payment tokens in the token database 130B may include a database key identifying a specific data item, a token ID which may be the payment token itself, a token status (e.g., valid, revoked, or on hold), and the provider of the payment token. This database 130B preferably does not include real account numbers associated with the payment tokens that it stores, or any other sensitive PAI (payment account information). A payment token may be revoked because it has expired, or has been reported or flagged as being fraudulent or misused (e.g., exceeding a payment boundary such as when a $10 token is used to conduct a $100 transaction). A payment token may be on hold when the token is valid and the use is not otherwise improper, but the use is temporarily suspended (e.g., due to a credit limit being temporarily exceeded).

As noted above, the TRL computer system 130 may be operated by a token issuer capable of generating tokens and providing the tokens to the first entity device 110 operated by the first entity 111. Alternatively, TRL computer system 130 may provide a token generating algorithm to the first entity device 110, or receive information about a token generating algorithm from the first entity device 110. In any case, the TRL computer system 130 can anticipate the receipt of any payment token that may be submitted by the first entity device 110 and maintain a comprehensive list of existing and possible tokens.

The computer readable medium 130A-2 of the TRL computer system 130 may further include code for one or more hashing or encryption algorithms. The TRL computer system 130 may also be configured to receive a token validation request, look up one or more tokens from the request in the token database, determine the status of the one or more tokens, generate a token validation response message indicating the status of the one or more tokens, and send the response message to the requester. Further, TRL computer system 130 can also receive notifications of compromised tokens and update the token database accordingly. For example, the TRL computer system 130 may determine that all tokens issued by a specific merchant or bank are revoked because the merchant or bank's token database was hacked, leaked, or otherwise compromised.

The first entity device 110 and the second entity device 120 may be included in a typical credit or debit account or card transaction processing system. For example, the second entity 121 which operates the second entity device 120 may be a merchant with an associated acquirer. In some embodiments, an acquirer computer associated with second entity 121 may employ the above described roles of second entity 121 in a token validation system. Further TRL computer system 130 may be located at any part of a typical transaction ecosystem or de-centralized and associated with a third party. For example, TRL computer system 130 may be associated with a payment processing network. In some embodiments, the first entity device 110, the second entity device 120, and TRL computer system 130 may each comprise a server computer, or be operatively coupled to a server computer.

A server computer can be a powerful computer or a cluster of computers. For example, the server computer can be a large mainframe, a minicomputer cluster, or a group of servers functioning as a unit. In one example, the server computer may be a database server coupled to a Web server.

An acquirer computer can be associated with the second entity device 120 if it is a merchant computer. The acquirer computer may be communicatively coupled to the merchant computer and a payment processing network computer and may issue and manage a financial account for the merchant.

In some embodiments, the acquirer computer may receive an authorization response message and may forward it to the merchant computer during a transaction to confirm processing of a payment transaction.

Figure 2:
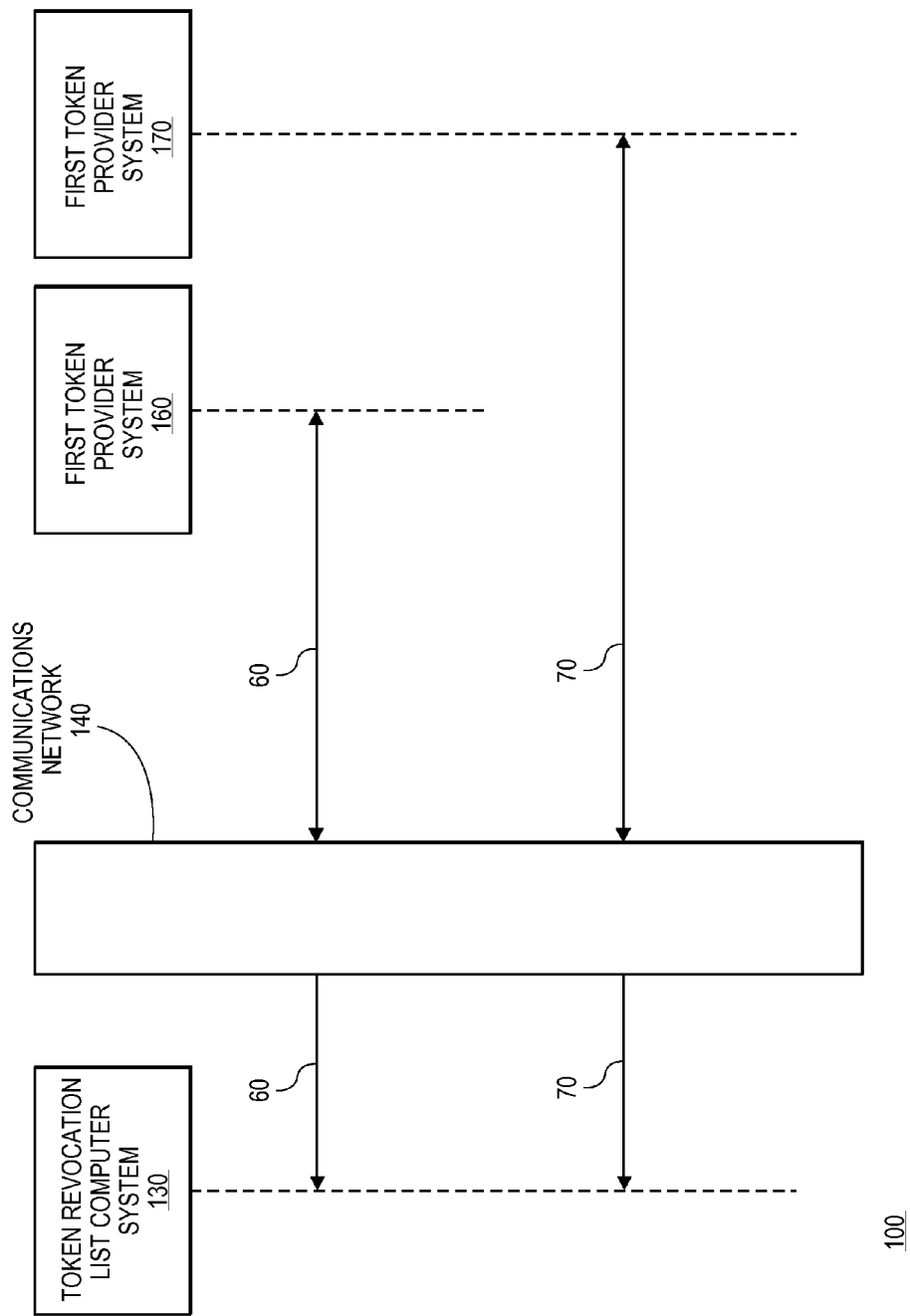
FIG. 2 shows another portion of the token validation system according to an embodiment of the present invention.

FIG. 2 shows another portion of the token validation system 100. FIG. 2 shows a first token provider system 160 and a second token provider system 170 communicating with the TRL computer system 130 via the communications network 140. The first and second token provider systems 160, 170 may be operated by any suitable entities that may generate and maintain payment tokens. Such entities may include payment processors, issuers, acquirers, merchants, etc.

Such information relating to tokens and the status of tokens may be passed between the first token provider system 160 and the TRL computer system 130 via the first communications path 60. Information relating to tokens and the status of tokens may be passed between the second token provider system 170 and the TRL computer system 130 via the second communications path 70. If either the first token provider system 160 or the second token provider system 170 has updates to the status of the tokens that it generated, then this information may be provided to the token revocation list computer system 130.

Figure 4:
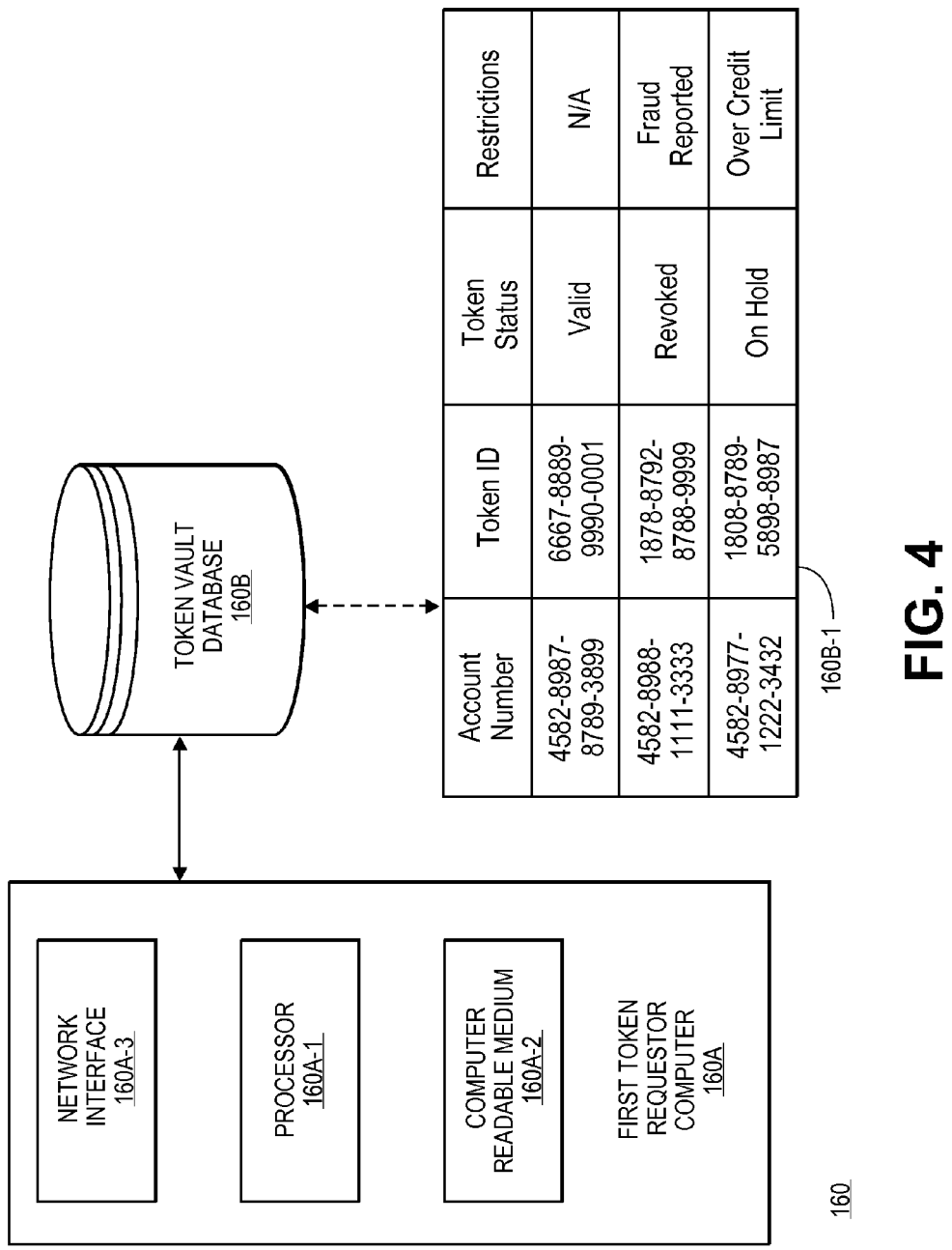
FIG. 4 shows a diagram of an exemplary token provider system according to an embodiment of the invention.

FIG. 4 shows a block diagram of some components of a token provider computer system 160. It includes a first token requester computer 160A, which may include a processor 160A-1 (which may include the same or different type of data processor as processor 130A-1 in FIG. 3), a computer readable medium 160A-2, and a network interface 160A-3. The token requester computer 160A may be coupled to a token vault database 130B, which may include token and account data 160B-1.

As shown in FIG. 4, the token vault database 160B may include token and account data 160B-1. Token and account data 160B-1 may include an real account numbers, payment tokens associated with those real account numbers, token statuses for those real account numbers, and any details or notes regarding the statuses. Generally with the exception of sensitive information such as the real account numbers of consumers, any of the information in the token vault database 160B may be shared with the TRL computer system 130. The information may be shared at any suitable time interval (e.g., daily, hourly, weekly, etc.).

II. Exemplary Methods

Exemplary methods according to embodiments of the invention may also be described with reference to FIGS. 1 and 2.

Before a transaction begins, between the first entity 111 and the second entity 121, the first entity 111 may select goods or services for purchase from the second entity 121. Additionally, before the transaction method shown in FIG. 1 begins, the TRL computer system 130 may build, manage, and/or maintain a status for each of a plurality of tokens issued by the various token provider systems including the first and second token provider systems 160, 170 shown in FIG. 2. Each of the first and second token provider systems 160, 170 may access the TRL computer system 130 by providing certain credentials (e.g., name, password, and device ID) which authenticate the first and second token provider systems 160, 170.

At step 10, using the first entity device 110, the first entity 111 may provide a payment token to the second entity device 120 to purchase goods and/or services from the second entity 121. The payment token may be used for a one time purchase or for recurring purchases. The payment token may be provided from the first entity device 110 to the second entity device 120 in any suitable manner. For example, the first entity device 110 may be a mobile phone that stores a payment token and this payment token may be transmitted to the second entity device 120 using any suitable contact based or contactless (e.g., RF) mode of transmission. In another example, the first entity device 110 may be a client computer and may direct a virtual wallet hosted by a wallet server to provide the payment token to the second entity device 120.

At step 20, the second entity 121 may be concerned that the first entity 111 has an infrastructure or device that may have been compromised, and may wish to validate the payment token with the TRL computer system 130 before proceeding with the transaction. In some cases, the second entity 121 may not intend to authorize the transaction until a later time, but may wish to verify that the transaction will likely be authorized by validating the payment token. Instead of immediately sending the payment token in an authorization request message to a payment processing network and/or issuer, the second entity 121 may compose and send a validation request message with their digital signature to TRL computer system 130.

The token validation request message, or TRL request 20 may comprise a requester name, hashed information, one or more payment tokens, and a nonce. The requester name may be the name of the entity that sent the request message. For example, the requester name may be the name of the second entity 121 or any other indication of the identity of the requester. The hashed information may include a hashing algorithm identifier (e.g. SHA-2 or SHA-3 identifier), a hash of the TRL computer system 130 name, a hash of the token issuer public key, and/or any other suitable information. The nonce may be a one-time value, such as a unique set of characters, to prevent replay attacks. Any subsequent message with a repeated nonce may be disregarded as fraudulent. The one or more payment tokens may be payment tokens provided by one or more entities such as the first entity 111.

At step 30, TRL computer system 130 may receive and read the signed token validation request message from the second entity 121 and may validate the payment token. The token validation request message may comprise at least one payment token or an identifier associated with the payment token. TRL computer system 130 may first assess the request message. In some embodiments, assessing the token validation request message may include validating the digital signature of the request message with a public key corresponding to the requester name included in the request message, and ensuring that the requester is authorized to validate the received token. If the request is invalid (e.g. the requester is unauthorized, request is badly formatted, not signed, has an incorrect signature, etc.), the TRL computer system 130 may not validate the token, and may instead send a response indicating that the request was not accepted.

If the request is valid, the TRL computer system 130 may accept the request message 20 and determine the status of the at least one token by searching the token revocation database for the status of the at least one token. Accordingly, the TRL computer system 130 may query the token database for a status associated with the received one or more tokens. TRL computer system 130 may look up the revocation status of the payment token in the token validation request message 20 received from the second entity device 120 in the token database in the TRL computer system 130. The TRL computer system 130 may determine that the token is, for example, valid (or active), on hold, or revoked. In some embodiments, a specific status code may be associated with the payment token. In some embodiments, the database of the TRL computer system 130 may be the only trusted location that is easily accessible to various parties where a compromise of the first entity's payment token would be recorded.

At step 40, TRL computer system 130 may generate and send a token validation response message, or TRL response 40, to the second entity device 120. The token validation response message 40 may comprise a response status, responder ID, timestamp, nonce, hashed information, one or more payment tokens, and one or more TRL status codes representing the status of the one or more payment tokens. For example, if TRL computer system 130 confirms that the payment token from the first entity 111 is valid, then it may return a status code "9", which mean that the token is valid. Alternatively, if the token validation request message was not accepted, the token validation response message may not indicate the TRL status code, but may instead indicate that the request was not accepted.

The response status may indicate whether the token validation request message was accepted. For example, the request message may be rejected because it is sent by an unauthorized requester, it is a badly formatted request, it is not signed, or for any other suitable reason.

The responder ID may be a hash value of the TRL computer system 130 public key. Alternatively, the responder ID may be any other value that may indicate the identity of TRL computer system 130.

The timestamp may indicate the time when the response was prepared and signed by the TRL computer system 130. For example, the timestamp may be the final composed portion of the message, and may indicate the time of the moment just before the message was finished and sent, or any other suitable time.

The one or more TRL status codes may indicate the status of the one or more payment tokens. For example, the payment tokens may have a status of valid (or active), on hold, or revoked. A token may be irreversible revoked if, for example, the token issuer (e.g. issuing bank or merchant, etc.) improperly issued a token, or if their token generation algorithm or any mechanisms that identify the payment instrument component of the token have been compromised. An "on hold" token may be a reversible status to mark a temporary state of the payment token. For example, the token issuing bank or merchant may not be sure if any component of their token lifecycle has been compromised, or there may be suspected fraudulent use of a token that turns out to be a false positive.

The status code may be a code representing a specific token state, and other statuses besides valid, revoked and on hold may be used. For example, in some embodiments of the invention, the number "0" may indicate that the status is unspecified, "1" may indicate that the token is suspected of fraud, "2" may indicate that the issuer of the token has been compromised, "3" may indicate that the processor of the token has been compromised, "4" may indicate that the token is expired, "5" may indicate that the token is not eligible for the type or amount of the requested transaction, and "6" may indicate that the token is valid. Any other suitable set of status code numbers that may indicate any other suitable status may also be used.

At step 50, the second entity device 120 may receive and cryptographically verify (this could be using a private key belonging to the second entity 120) the token validation response message. For example, in some embodiments, second entity device 120 may verify a digital signature of response message 40 using a public key corresponding to the responder ID received in response message 40. The second entity device 120 may then proceed to accept the payment token if it is valid, and send a message to the first entity device 110 indicating that the payment token is accepted, and complete the transaction with the first entity 111 (as described above). The second entity 121 may release the goods and/or services purchased by the first entity 110. If the token validation response message indicates that the token is revoked or on hold, the second entity 120 may reject the token. The second entity 120 may then send a message to the first entity 110 indicating that the token was rejected and the transaction is denied, or that different payment information should be provided.

Embodiments of the invention have a number of advantages. For example, by providing a token revocation list at a central location, accessible to and used by a number of different token issuing entities, the statuses of tokens that are used in a payments ecosystem can be checked before proceeding with transactions. This provides for a convenient way for entities that issue payment tokens to communicate the statuses of their tokens to various users in the ecosystem that want to use or process payment tokens. In addition, some of the specific communication protocols disclosed herein provide for a secure and efficient way for token status requesters to safely inquire about the status of payment tokens, even if the communication network that is being used is not as secure as it should be. This not only protects the status of the tokens from eavesdroppers, but can prevent unauthorized parties from requesting the status of a token.

It is noted that other embodiments are also possible. For example, embodiments of the invention could be operated by an issuer, acquirer, or any other entity within a transaction processing system.

Figure 5:
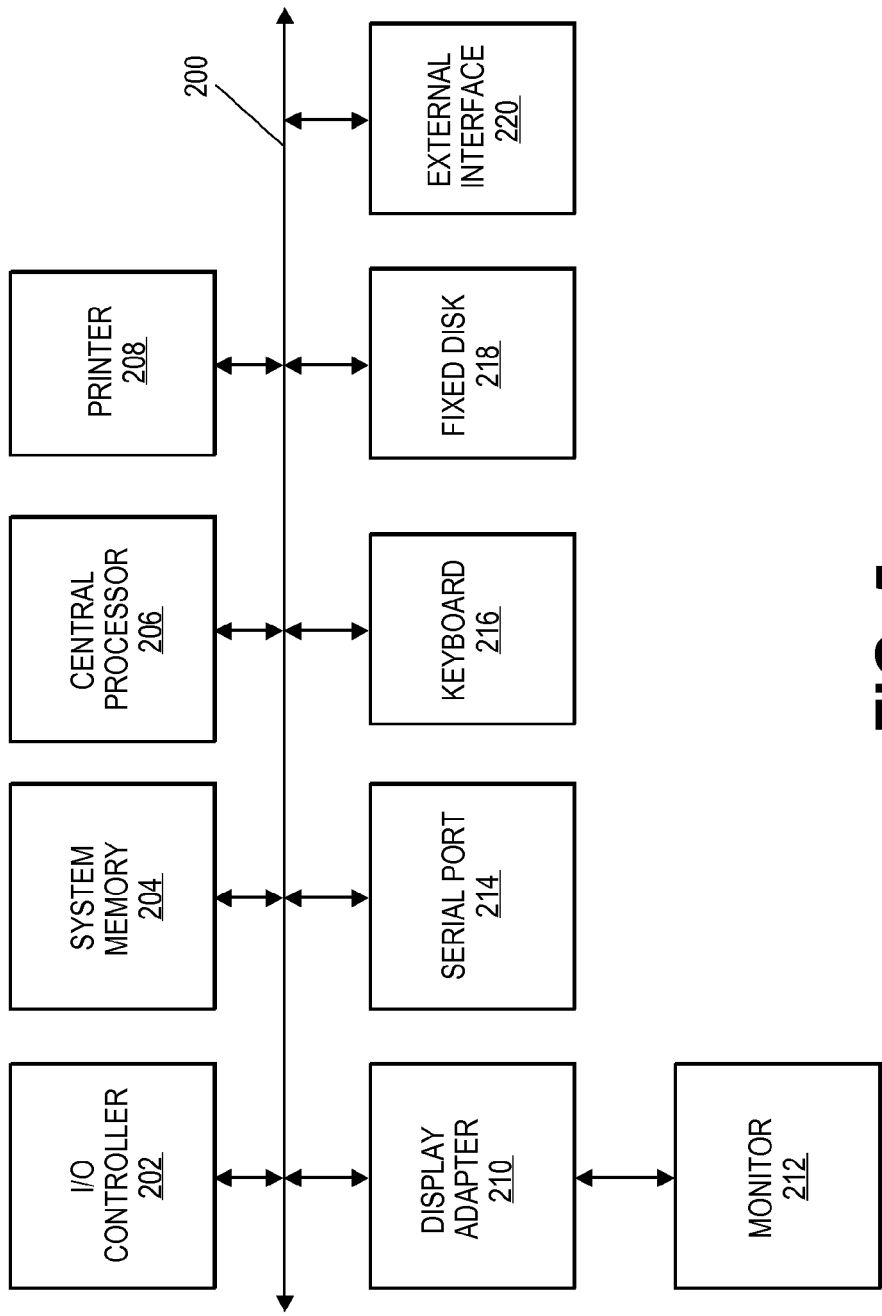
FIG. 5 shows a block diagram of a computer system according to an embodiment of the invention.

The various participants and elements in any of FIGS. 1-4 may operate one or more computer apparatuses (e.g., a server computer) to facilitate the functions described herein. Any of the elements in FIGS. 1-4 may use any suitable number of subsystems to facilitate the functions described herein. Examples of such subsystems or components are shown in FIG. 5. The subsystems such as a printer 208, keyboard 216, fixed disk 218 (or other memory comprising computer readable media), monitor 212, which is coupled to a display adapter 210, and others are shown. Peripherals and input/output (I/O) devices, which couple to I/O controller 202, can be connected to the computer system by any number of means known in the art, such as serial port 214. For example, serial port 214 or external interface 220 can be used to connect the computer apparatus to a wide area network such as the Internet, a mouse input device, or a scanner. The interconnection via system bus allows the central processor 206 to communicate with each subsystem and to control the execution of instructions from system memory 204 or the fixed disk 218, as well as the exchange of information between subsystems.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It should be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   generating, by a token revocation list computer system, a status for each of a plurality of tokens issued by a server computer that is coupled with a token revocation database of the token revocation list computer system, wherein the plurality of tokens are generated by a plurality of different entities;
   maintaining, by the token revocation list computer system, the status for each of the plurality of tokens in a token revocation list, and wherein the token revocation list is centrally stored;
   receiving, by the token revocation list computer system, a token validation request from a requester, wherein the token validation request includes at least one payment token of the plurality of tokens, a digital signature of the requester, and a public key;
   determining, by the token revocation list computer system, the status of the at least one payment token of the plurality of tokens included in the token validation request by searching the token revocation database for the status of the at least one of the plurality of tokens;
   determining, by the token revocation list computer system, if the requester is authorized to validate the at least one payment token by validating the digital signature of the requester with the public key;
   generating, by the token revocation list computer system, a token validation response in accordance with the token validation request and the status of the token in the token revocation list; and
   sending, by a token revocation list computer system, the token validation response including the determined status of the at least one payment token of the plurality of tokens to the requester,
   wherein in response to the determined status of the at least one payment token of the plurality of tokens being valid, completing a payment transaction.

2. The method of claim 1, wherein the at least one of the plurality of tokens was sent to the requester by a consumer or merchant.

3. The method of claim 1, further comprising: determining, by the server computer, that the requester is registered with the token revocation list computer system for sending token validation requests.

4. The method of claim 1 wherein the status is at least one of on hold, revoked, or active.

5. The method of claim 1 wherein the token validation request comprises one or more of a requester name, hashed information, the at least one payment token, and a nonce.

6. The method of claim 1 wherein the token validation response comprises one or more of token response status, a TRL computer system ID, a timestamp, a nonce, hashed information, the at least one payment token and a TRL computer system status code.

7. The method of claim 1 wherein the token validation response is sent to a requester device.

8. The method of claim 1 wherein the token validation request and response are transmitted through a communications network that is insecure.

9. The method of claim 1 wherein the at least one payment token is a single payment token that is a pseudo account number with a same format as a real account identifier associated with a payment account associated with a consumer.

10. The method of claim 9 wherein the payment account is a credit card account.

11. The method of claim 1, further comprising consolidating, by the token revocation list computer system, payment tokens generated by a plurality of different entities in the token revocation list.

12. The method of claim 1, wherein the token revocation list is accessible by a plurality of different types of requester devices in order to check the status of a payment token.

13. The method of claim 1, wherein the payment token is associated with a payment account that is a substitute for an account identifier.

14. The method of claim 1, wherein the payment token comprises a series of alphanumeric characters that is a substitute for an account identifier.

15. A token revocation list computer system comprising:
   a token status list database; and
   token status list computer comprising a processor, and a computer readable medium coupled to the processor, the computer readable medium comprising, code executable by the processor, to implement a method comprising:
   generating, by a token revocation list computer system, a status for each of a plurality of tokens issued by a server computer that is coupled with a token revocation database of the token revocation list computer system, wherein the plurality of tokens are generated by a plurality of different entities;

maintaining the status for each of the plurality of tokens in a token revocation list, and wherein the token revocation list is centrally stored;

receiving a token validation request from a requester, wherein the token validation request includes at least one payment token of the plurality of tokens, a digital signature of the requester, and a public key;

determining the status of the at least one of the plurality of tokens by searching the token revocation database for the status of the at least one payment token of the plurality of tokens included in the token validation request;

determining, by the token revocation list computer system, if the requester is authorized to validate the at least one payment token by validating the digital signature of the requester with the public key;

generating, by the token revocation list computer system, a token validation response in accordance with the token validation request and the status of the token in the token revocation list; and sending the token validation response including the determined status of the at least one payment token of the plurality of tokens to the requester, wherein in response to the determined status of the at least one payment token of the plurality of tokens being valid, completing a payment transaction.

16. The token revocation list computer system of claim 15 wherein the status is at least one of hold, revoked, or active.

17. The token revocation list computer system of claim 15 wherein the token validation request comprises one or more of a requester name, hashed information, the at least one payment token, and a nonce.

18. The token revocation list computer system of claim 15 wherein the token validation response comprises one or more of token response status, a TRL computer system ID, a timestamp, a nonce, hashed information, the at least one payment token and a TRL computer system status code.

19. A token validation system comprising:
a requester device; and
a token revocation list computer system in communication with the requester device, the token revocation list computer system comprising (a) a token status list database, and (b) a token status list computer comprising a processor, and a computer readable medium coupled to the processor, the computer readable medium comprising, code executable by the processor, to implement a method comprising:

generating, by a token revocation list computer system, a status for each of a plurality of tokens issued by a server computer that is coupled with a token revocation database of the token revocation list computer system, wherein the plurality of tokens are generated by a plurality of different entities;

maintaining the status for each of the plurality of in a token revocation list, and wherein the token revocation list is centrally stored;

receiving a token validation request from a requester, wherein the token validation request includes at least one payment token of the plurality of tokens, a digital signature of the requester, and a public key;

determining the status of the at least one of the plurality of tokens included in the token validation request by searching the token revocation database for the status of the at least one payment token of the plurality of tokens;

determining, by the token revocation list computer system, if the requester is authorized to validate the at least one payment token by validating the digital signature of the requester with the public key;

generating, by the token revocation list computer system, a token validation response in accordance with the token validation request and the status of the token in the token revocation list; and sending the token validation response including the determined status of the at least one payment token of the plurality of tokens to the requester, wherein in response to the determined status of the at least one payment token of the plurality of tokens being valid, completing a payment transaction.

20. The token validation system of claim 19 further comprising: a token provider system in communication with the token revocation list computer system.

21. The token validation system of claim 19 wherein the token validation request comprises a requester name, hashed information, the at least one payment token, and a nonce.

22. The token validation system of claim 21 wherein the token validation response comprises a token response status, a TRL computer system ID, a timestamp, a nonce, hashed information, the at least one payment token and a TRL computer system status code.

23. The token validation system of claim 21, wherein the requester device comprises a merchant device.

* * * * *